Patented May 9, 1933

1,908,361

UNITED STATES PATENT OFFICE

ALEXANDER IZSAK, OF CENTRAL PARK, NEW JERSEY, AND FOREST J. FUNK, OF WILMINGTON, DELAWARE, ASSIGNORS, BY MESNE ASSIGNMENTS, TO E. I. DU PONT DE NEMOURS AND COMPANY, OF WILMINGTON, DELAWARE, A CORPORATION OF DELAWARE

PROCESS OF PRODUCING BUTYL ALCOHOL

No Drawing. Continuation of application Serial No. 469,914, filed July 22, 1930. This application filed May 28, 1931. Serial No. 540,628.

This invention relates to a process of producing normal butyl alcohol, acetone, and isopropyl alcohol by the fermentation of non-amylaceous carbohydrates, and more particularly to the production of such products by the fermentation of cane (black-strap) molasses, by means of an organism not heretofore known or described.

This application is a continuation of our application Serial No. 469,914, filed July 22, 1930.

Many previous attempts have been made to produce satisfactory yields of these solvents by the fermentation of cane molasses without success. It has become rather common practice to produce such solvents by fermentation of cereal mashes with the organism variously known as *Bacillus granulobacter pectinovorum* Beyerinck and Van Delden (British Patent 4845 of 1915, to C. Weizmann); *Clostridium acetobutylicum* (British Patent 315,002 to Jan Augusto Viljoen), and similarly by other names. This organism is primarily a starch fermenter, and while it will, under certain laboratory conditions, ferment various sugars, as well as starch, with apparently satisfactory results, attempts to ferment sugars directly on a commercial manufacturing scale using this particular organism, have not been successful, principally because of the peculiar physiological properties possessed by the organism.

With a view of overcoming the difficulties previously encountered, Waters (U. S. Patent 1,546,694) proposes the addition to molasses mashes of vegetable protein material, such as corn gluten; Robinson (U. S. Patent 1,510,526) proposes a pretreatment of the molasses with activated charcoal; Viljoen (British 315,002 supra) uses a very large inoculum, and treats the mash so as to secure predigestion of the proteins present or added; Pike and Smyth (U. S. Patent 1,655,435) have designated the organism *Clostridium butyricum* Prazmowski, and assert that satisfactory results may be obtained "in the absence of amylaceous vegetable material". In so far as we are aware, none of these processes have been entirely commercially successful primarily because the organism, notwithstanding attempts at acclimatization to a sugar medium instead of a starch medium, remains essentially a starch fermenter, and cannot be depended upon to produce its characteristic reaction in the presence of sugars, or in a sugar medium.

In further pursuance of the general investigation which led to the isolation of *B. saccharobutylicum-beta* (Izsak U. S. Patent No. 1,725,083) we have now isolated a second organism belonging to the same group, which we have named *Clostridium saccharobutylicum-gamma*. As described in the patent above referred to, the object of the former invention was the production of butyl and isopropyl alcohols in the main, along with small quantities of acetone. The new organism which we have now isolated, when used to ferment, for example cane molasses (black-strap) gives rise to these same three products, but in different relative proportions. In the case of *beta*, approximately five to ten times as much isopropyl is formed as acetone, while *gamma* produces these products in approximately the inverse ratio, i. e., ten to twenty times as much acetone as isopropyl.

Aside from the variation in the relative proportions of the end products of the fermentation, and the methods of their isolation, these two organisms are practically indistinguishable from each other. Neither can ferment cereal starch to any practical extent; both can produce high yields of solvents in the presence of excess calcium carbonate. Neither culture can be used in the commercially operating processes for the production of butyl alcohol and acetone directly from corn meal or other cereal products as now practiced. One difference which is of importance from an industrial standpoint is that with ordinary black-strap molasses the use of calcium carbonate or other similar neutralizing agents is desirable, when *beta* is used, while under the same conditions the addition of calcium carbonate to *gamma* fermentations seems to be without either favorable or adverse effect.

According to our present invention we have now discovered a new process for producing mainly butyl alcohol and acetone with other products by means of an organism not heretofore isolated, or used for this purpose. This new organism is capable of fermenting the sugars in a solution of black-strap molasses, or in other non-amylaceous mashes, with satisfactory yields of butyl alcohol and acetone, without the addition of foreign protein or vegetable material, and without pretreatment of the solution to be fermented other than sterilization which is essential in any case. This organism, to which we have given the name *Clostridium saccharobutylicum-gamma* is characterized in accordance with the descriptive chart of the Society of American Bacteriologists, as follows:

Source: Rice
Name: *Clostridium saccharobutylicum-gamma*.

I. Morphology.
1. Vegetative cells actively motile
    Media used—6 Brix solution of blackstrap molasses, partly neutralized with calcium carbonate; pH 5.6; temp. 34° C.; age 30 hours.
    Form: Short and long rods, occasional early short chain formation.
    Size: 6–20 microns × 2–3 microns.
    Ends: Rounded
    Stain: Will not stain with methylene blue or gentian violet readily
    Gram stain variable
2. Sporangia:
    Media used—6 Brix solution of blackstrap molasses, partly neutralized with calcium carbonate; pH 5.6; temp. 34° C.; age 60 hours.
    Form: Oval
    Spores: Sub-terminal to terminal
    Limits of Size: 2 to 4 microns.
    Spores will not stain readily with methylene blue.

II. Cultural Features.
1. Nutrient agar slant: no growth (on aerobic surface).
    Nutrient agar in deep stab: no growth along stab until depth of 1 cm. is reached. Below this point growth on puncture uniform, papillate.

III. Physical and biochemical features.
Substances fermented with gas evolution

| | 12 hours | 40 hours |
|---|---|---|
| Sucrose | xxx | xxxx |
| Maltose | xxx | xxxx |
| Lactose | x | x |
| Dextrose | x | xx |
| Levulose | xxx | xxxx |
| Galactose | x | x |
| Xylose | x | x |
| Inositol | x | x |
| Starch (maize) | x | x |
| Inulin | xx | xxx |
| Mannitol | x | x |
| Glycerol | x | x |
| Broth | x | x |

Definition of foregoing terms:
x _____ Present
xx _____ Strong
xxx _____ Very strong
xxxx _____ Strongest Enzyme production:
Amylase, very weak
Organism dies on repeated transfers in corn meal suspensions.

Products of fermentation:
Liquid: n-Butyl alcohol (65–80%).
Actone (18–34%)
Isopropyl alcohol (1–2%)
Traces of ethyl alcohol and other compounds.
Gaseous: $CO_2$
$H_2$ It will be seen by comparing the description of our new species of organism with that of the organism used commercially for the production of butyl alcohol and acetone from cereal mashes as given in the literature previously cited, that it differs specifically from the latter in its inability to liquefy and/or ferment the major portion of a cereal starch mash. Its gross characteristics, morphology, and its fermentation reactions except toward cereal starch, as will be noted, are in general similar to those of the latter organism; it is, however, a distinct species, and cannot be substituted for the latter organism in the grain mashes in which the latter organism is commercially employed.

This new organism which we prefer to call *Clostridium saccharobutylicum-gamma* is also specifically different from the foregoing commercial organism, known as *Clostridium acetobutylicum*, *Clostridium butyricum*, etc., in other important characteristics. For example, in a sugar solution containing alkaline material, such as calcium carbonate, or in such solutions where the acidity is continuously reduced by the addition of soluble alkalies, the *Clostridium butyricum* will produce large amounts of butyric acid, so much so in fact as to almost eliminate the formation of butyl alcohol and acetone in extreme cases. This is a recognized property of this organism, and this point has been developed at some length by M. Schoen (Ann. Soc. Zymologie pure et applique, vol. 1, No. 3; Ann. Brass. et Dist., 1927, vol. 25, pp. 321–327, 343–347, 359–362). Weizmann and Spiers (British Patent 164,762) have disclosed the production of butyric acid by this organism in media containing calcium carbonate or other alkalies.

In contrast with this behavior, we have found that our new organism, *Clostridium saccharobutylicum-gamma*, will ferment sugar solutions in the presence of calcium carbonate, without serious or even detectable reduction in the yield of solvents, and without the production of more than traces of butyric acid. On the other hand, the presence of calcium carbonate or other similar material sometimes used in the mash to be fermented is not only not essential, but may be considered useless and without effect, although not harmful.

The fact that our organism is new and differs markedly from other organisms capable of producing butyl alcohol that have been hitherto described or employed in the art will be more readily understood from the following description of the method employed and the principles involved in isolating and developing it explained in greater detail hereinafter.

It is a well known principle that starch is a carbohydrate stored up by many higher plants in a form insoluble in water for the future use of themselves or their progeny. These plants, however, cannot utilize the starch they have produced unless it is first acted upon by another product (amylase) also elaborated by themselves to bring the insoluble starch through a series of hydrolyses into a completely water soluble carbohydrate, generically known as sugar. There are in nature other organisms incapable themselves of, or rarely producing starch which are, however, capable of producing the hydrolytic agent (amylase) which changes insoluble starch into soluble sugar. They are thus enabled to appropriate for their own uses a food stored up by another organism. Such a group of organisms is exemplified by those butyl alcohol producing organisms which are described in the literature and used in the industry. There is still another class of lower organisms which, while requiring water-soluble carbohydrates, produced by other living organisms as a food, are not able to produce the amylase which would permit them to appropriate insoluble starch which may be in their immediate environment. Examples of organisms in this general class are the well known yeasts used in industry for the production of ethyl alcohol. Such organisms often feed at the same table with other low forms upon food which neither of the mess mates alone is capable of itself producing. Under such circumstances one of the organisms of the lower forms may be able to produce such a saccharifying enzyme (amylase) as will yield from available starch as much sugar as both need. It will thus be apparent that many low forms of organisms are capable of growing on carbohydrates which are produced either originally in the water soluble form or are brought into such form by the activities of another organism.

The problem that confronted us was to ascertain the existence, by isolation, of any organisms capable of producing butyl alcohol in commercial quantities which might belong to the second unexplored class of non-amylase producing forms. One of the early results of this study was the isolation of such an organism which was found capable of producing butyl alcohol, isopropyl alcohol, and acetone from soluble carbohydrates. Such a culture is the essential organism described and claimed in Izsak U. S. Patent 1,725,083.

We have now discovered this second new organism (*Clostridium saccharobutylicum-gamma*) similarly incapable of fermenting cereal starch unaided. This organism, like many heretofore described, produces chiefly butyl alcohol and acetone, but differs from them so markedly that it cannot be used in them commercially existing processes without fundamental changes in equipment and procedure as hereinbefore described.

In the isolation of this organism from its original habitat, rice, such methods of heat treatment, culture in media of varying pH concentrations, carbohydrate source, etc., were employed as would tend to favor the development of organisms of this particular type if they existed.

The following illustrative example of one method of isolating of this organism is as follows:

Rice grains (a source of starch) distributed in several containers, were heated in boiling water for 30 minutes; this naturally eliminated nearly all of the living organisms on the starch since most micro-organisms are incapable of with standing such treatment. Next, sufficient concentrated lactic acid was added to the medium to bring the pH to approximately 3.0. This step provided a still further limiting factor which would further restrict the number and character of the surviving organisms which could later develop. A second function of the added acid was to transform the insoluble starch to a soluble form. To facilitate this transformation the rice suspension was incubated at 63° C. for 48 hours, this producing hydrolytic products grading through soluble starch to sugars. Calcium carbonate was then added in excess, the suspension again heated to 100° C., and returned to the 63° C. incubator for another 24 hours. Finally the containers prepared as above were incubated at 32° C. to permit possible fermentation to set in, and a large percentage of them developed fermentation, the active organism being *Clostridium saccharobutylicum-gamma*.

No plating is required to purify the culture on account of the rigorous selective process used in the isolation, but heating to 85° C. for 15 minutes and reincubating several times is all that is necessary. This last step is applied to spore-laden cultures, after several days of actual fermentation, since complete destruction would result if applied while in the young, vegetative form of less than a day old.

Our invention, of course, is not limited to the process of producing butyl alcohol, etc., by an organism isolated and purified in the manner described above, as other methods will suggest themselves from the foregoing.

As a further illustration of our invention the following example is given of the method of using this organism, but it is to be understood that this is in no way to be taken as a limitation of the invention. A culture of the organism, *Clostridium saccharobutylicum gamma*, was prepared in a volume of approximately three liters of sterilized black-strap molasses solution having a sugar concentration of about 30 to 40 grams of sugar per litre, and incubated at 33 to 38° C. for 24 hours. At the end of this time, this laboratory culture was added under aseptic conditions, to 150 gallons of a similarly sterilized solution of black-strap molasses in a suitable small fermenter, or seed tank. This seed culture was in turn kept at 33 to 38° C. for about 24 hours, whereupon it was used to inoculate a similar mash having a volume of approximately 4,850 gallons. This mash was then allowed to ferment at the above specified temperature for about 72 to 120 hours, when fermentation had ceased. The fermented "beer" was then found to contain about 1 to 1.25 per cent of solvents (i. e., normal butyl alcohol and acetone, and isopropyl alcohol, plus possible traces of other compounds) by volume, which may be distilled from the "beer" by well known methods. There was obtained approximately 50 to 65 gallons of anhydrous solvents, representing about 32 per cent by weight of the original carbohydrates (calculated as invert sugar) in the original mash. The amounts of solvents obtainable in this way will, of course, vary, depending upon the original sugar content. Substantially greater yields than 32 per cent may be obtained when careful attention is given to the technique of the process.

While the preferred concentration of the mash is from 30 to 40 grams of sugar per litre, any concentration up to about 75 grams per litre may be used. The preferred temperature range is between 33 and 38° C., but temperatures of from 25 to 40° C., or even higher are possible. Outside of the preferred range of temperatures, however, the fermentation becomes too slow to be practical economically.

The molasses solution constituting the mash to be fermented need not necessarily be clarified, or treated with activated carbon, nor is it necessary that the hydrogen ion concentration be adjusted to any other than that resulting from the acids contained in the molasses itself, which is usually between a pH of 5 to a pH of 6. The addition of foreign proteins, such for example as corn gluten, soy bean meal, etc., carbon ammonium salts, and phosphates is unnecessary as is also the addition of calcium carbonate or any other alkaline material, although these substances may be added if desired.

While the foregoing description and examples illustrates certain embodiments of our invention, particularly as applied to the fermentation of black-strap molasses, we do not intend to be limited thereto, as sugars from other sources may equally well be used, such for example as commercial dextrose or maltose, cane sugar, whey, and beet molasses, the appropriate and necessary nitrogeneous material and salts in the case of pure sugars being supplied to replace the nutrients normally present in molasses. It will, therefore, be apparent that we do not intend to limit our invention except as indicated in the appended claims.

We claim:

1. The process which comprises adding to a sterilized, non-amylaceous, water-soluble carbohydrate mash, a culture of bacteria which are incapable, unaided, of fermenting cereal starch, which are sufficiently heat resistant in the spore form to withstand a temperature of 100° C. for approximately five minutes and are capable of producing butyl alcohol and acetone by the fermentation of the carbohydrates in such a mash, and maintaining the thus seeded mash at a temperature sufficient to bring about active fermentation.

2. The process of claim 1 in which the source of the carbohydrate is black-strap molasses.

3. The process of claim 1 in which the mash is maintained at a temperature of 24° C. to 40° C.

4. The process that comprises adding to a water-soluble, non-amylaceous carbohydrate mash, a culture of a micro-organism capable of producing, unaided, from the carbohydrate in the mash, butyl alcohol and acetone in a ratio substantially greater than two parts of butyl alcohol to one part of acetone.

5. The process which comprises adding a culture of a herein described micro-organism to a sterilized mash of non-amylaceous, water-soluble carbohydrate and maintaining the mash at a temperature sufficient to bring about active fermentation.

6. The process of claim 5 in which the source of the carbohydrate is a black-strap molasses mash.

7. The process of claim 5 in which the temperature of the mash is maintained between 24° C. and 40° C. during fermentation.

8. The process which comprises adding a culture of a hereinbefore described micro-organism *Clostridium saccharobutylicum-gamma* to a sterilized mash containing approximately 0.5 to 7.5 per cent. of non-amylaceous, water-soluble carbohydrate, and maintaining the seeded mash at a temperature sufficient to bring about active fermentation.

9. The process of claim 8 in which the sugar concentration of the mash is between 3 and 6 per cent.

10. The process of claim 8 in which the source of the carbohydrate is black-strap molasses.

11. The process of claim 8 in which the fermentation is carried out in the absence of foreign protein and vegetable matter.

12. The process which comprises adding a culture of the hereinbefore described microorganism *Clostridium saccharobutylicum-gamma* to a sterilized medium containing non-amylaceous, water-soluble carbohydrate, maintaining the seeded mash at a temperature sufficient to bring about active fermentation, and recovering from the fermented mash butyl alcohol, acetone, and isopropyl alcohol, which have been formed therein in decreasing ratios respectively.

13. The process of claim 12 in which the source of the carbohydrate is black-strap molasses.

14. The process of claim 12 in which the sugar concentration of the carbohydrate is between 0.5 and 7.5 per cent.

15. The process of claim 12 in which the sugar concentration of the carbohydrate is between 3 and 6 per cent.

16. The process of claim 12 in which the temperature of the mash is maintained at 24° C. to 40° C.

17. The process of claim 12 in which the fermentation is carried out in the absence of foreign protein and vegetable matter.

18. In the process of producing butyl alcohol and acetone by fermentation, the steps of preparing suitable cultures which comprise heating a plurality of samples of rice grains in boiling water for approximately thirty minutes, adding sufficient concentrated lactic acid to the medium to bring the pH to approximately 3.0, incubating the suspension at about 63° C., adding calcium carbonate to the suspension, heating the suspension to approximately 100° C., and again further incubating the samples.

19. The process of producing butyl alcohol, acetone and isopropyl alcohol which comprises causing the fermentation of a non-amylaceous carbohydrate mash by means of the organism *Clostridium saccharobutylicum-gamma*.

20. The process of producing butyl alcohol and acetone which comprises causing the fermentation of a sugar solution by means of the organism *Clostridium saccharobutylicum-gamma*.

21. The process of producing butyl alcohol and acetone which comprises causing the fermentation of a molasses mash by means of the organism *Clostridium saccharobutylicum-gamma*.

22. The process of claim 21 in which the fermenting solution is maintained at a temperature of from 33 to 38° C.

23. The process of producing butyl alcohol, acetone and isopropyl alcohol which comprises causing the fermentation of a sugar solution of the type found in molasses mash, malt or whey by means of the organism *Clostridium saccharobutylicum-gamma*.

24. The process of claim 21 in which the mash has a sugar concentration of 3 to 5%.

25. The process of producing butyl alcohol and acetone which comprises causing the fermentation of a molasses mash free of foreign protein and vegetable matter by means of the organism *Clostridium saccharobutylicum-gamma*.

26. The process of producing butyl alcohol and acetone which comprises causing the fermentation of a sugar solution containing foreign protein material by means of the organism *Clostridium saccharobutylicum-gamma*.

27. The process of producing butyl alcohol, acetone and isopropyl alcohol which comprises causing the fermentation of a black-strap molasses free of foreign protein and vegetable matter by means of the organism *Clostridium saccharobutylicum-gamma*.

In testimony whereof we affix our signatures.

ALEXANDER IZSAK.
FOREST J. FUNK.